April 7, 1964      J. E. HEIDER      3,127,636
METHOD AND APPARATUS FOR PRODUCING HOLLOW PLASTIC ARTICLES
Filed Nov. 1, 1961      2 Sheets-Sheet 1

INVENTOR.
JAMES E. HEIDER
BY
CHARLES S. LYNCH
& W. A. SCHAICH
ATTORNEYS

April 7, 1964     J. E. HEIDER     3,127,636
METHOD AND APPARATUS FOR PRODUCING HOLLOW PLASTIC ARTICLES
Filed Nov. 1, 1961     2 Sheets-Sheet 2

INVENTOR.
JAMES E. HEIDER
BY CHARLES S. LYNCH
& W. A. SCHAICH
ATTORNEYS

United States Patent Office 3,127,636
Patented Apr. 7, 1964

3,127,636
METHOD AND APPARATUS FOR PRODUCING HOLLOW PLASTIC ARTICLES
James E. Heider, Toledo, Ohio, assignor to Owens-Illinois Glass Company, a corporation of Ohio
Filed Nov. 1, 1961, Ser. No. 149,354
14 Claims. (Cl. 18—5)

This invention relates to a method and apparatus for producing hollow plastic articles having relatively small portions in some areas and substantially larger portions in other areas and more particularly to a method and apparatus for producing plastic containers having relatively small neck portions and larger body portions without the presence of undesirable neck flash thereon.

In the manufacture of hollow plastic articles it is conventional to extrude heated thermoplastic material from an extrusion head in the form of tubing. This tubing is placed between the open halves of a partible blow mold. The mold halves are then closed around such tubing and the tubing thus enclosed is expanded to conform to the mold cavity. It is quite obvious that the expansion of such tubing in the mold cavity results in a blown article having considerably thinner walls than did the tubing from which it was blown. The greater the periphery of the mold cavity with respect to the periphery of the extruded tubing, the greater will be the reduction in wall thickness.

When the cross-sectional size of the mold cavity is fairly large, it is a problem to provide a sufficient amount of thermoplastic material so as to preclude the finished hollow article from having excessively thin wall portions. One method of providing a sufficient amount of thermoplastic material has been to increase the cross-sectional area of said thermoplastic material by increasing the diameter but not the wall thickness of such tubing. However, the problem with increasing the diameter of the extruded tubing is that when the mold sections close around such tubing, the neck portion of the mold, which is then smaller than the tubing, pinches the tubing, forming objectionable flash which must be removed from the hollow article. Such removal requires either an additional processing step of trimming the flash or expensive modifications to the equipment to accomplish the trimming concurrently with the forming process. In any event, trimming increases the cost of producing hollow plastic articles and in the case of containers the resultant article is less attractive because the flash can never be smoothly trimmed from the threaded portions of the neck.

Another method of providing a sufficient amount of thermoplastic material has been to increase the wall thickness of the extruded tubing by decreasing the inside diameter. Under this method the outside diameter is sufficiently small to permit the neck portion of the partible mold to close around the tubing without pinching such tubing, thus permitting the hollow article to be formed without objectionable neck flash. However, inasmuch as the inside diameter has been decreased in size, it is then smaller than the desired inside diameter of the neck portion. As a result it becomes necessary to enlarge such inside diameter.

The prior art method of enlarging such inside diameter has been to ream it out by a separate operation after the blowing operation is completed. Such separate operation, of course, increases the cost of producing the hollow article.

Accordingly, it is an object of this invention to provide a novel method and apparatus for reaming such neck portion substantially concurrently with the blowing operation.

Another object of this invention is to provide a method and apparatus wherein hollow plastic articles having relatively small neck portions may be formed without objectionable neck flash.

A further object of this invention is to provide a novel method and apparatus for trimming the top of the neck portion of such hollow article.

The specific nature of this invention, as well as other objects and advantages thereof, will become apparent to those skilled in the art from the following detailed description taken in conjunction with the annexed sheets of drawings on which is illustrated the preferred embodiment of this invention.

Figure 1:
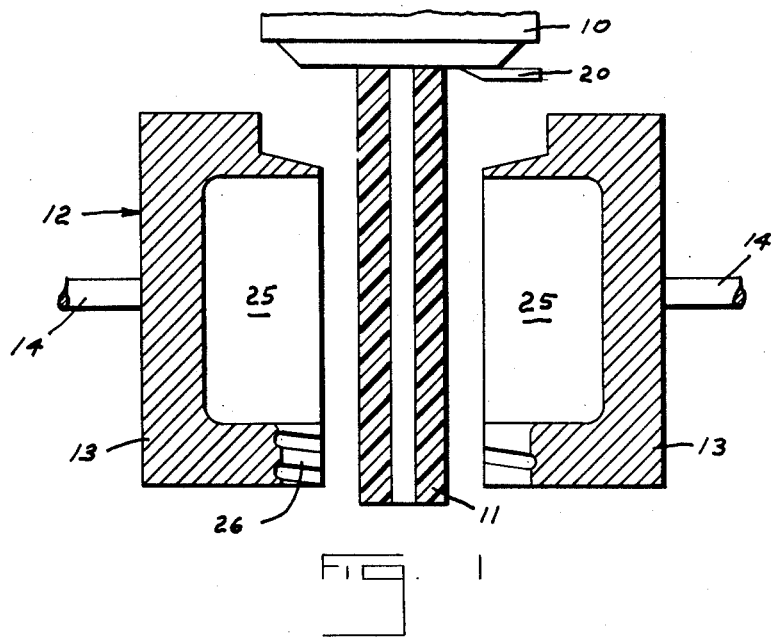
FIG. 1 is a schematic view partly in section of apparatus for the production of plastic containers showing a section of extruded tubing positioned between the open halves of a partible blow mold.

Referring to FIG. 1, there is shown an extrusion head 10 from which heated thermoplastic material issues in the form of tubing 11 having relatively thick wall portions. A knife 20 is provided to sever tubing 11 from extrusion head 10. A blow mold generally designated 12 comprising mold sections or halves 13 is positioned under extrusion head 10. The apparatus normally employs fluid actuated cylinders (not shown) connected to pistons 14 which move mold sections 13 into an open and closed position. The mold sections comprise a body portion 25 having a relatively large cross-sectional area and a neck portion 26 having a considerably smaller cross-sectional area.

Inasmuch as the body portion 25 is fairly large, it is necessary to provide a relatively large amount of thermoplastic material so as to preclude the hollow article blown in such body portion from having excessively thin wall portions. On the other hand, it is also necessary that the outside diameter of the extruded tubing be smaller than the diameter of the neck portion 26 of blow mold 12 in order to permit the mold sections 13 to close around tubing 11 (FIG. 2) without pinching the portion of such tubing lying within such neck portion 26.

As previously noted, these dual objectives of supplying tubing having a sufficiently large quantity of material while also having a smaller outside diameter than the diameter of neck portion 26 are accomplished by providing tubing having a relatively small inside diameter. It is quite obvious that such inside diameter may well be smaller than the desired inside diameter of the neck portion of the finished container. As a result, it is necessary to enlarge the inside diameter of such neck portion. The method and apparatus for enlarging the inside of such neck portion are hereinafter described.

Figure 3:
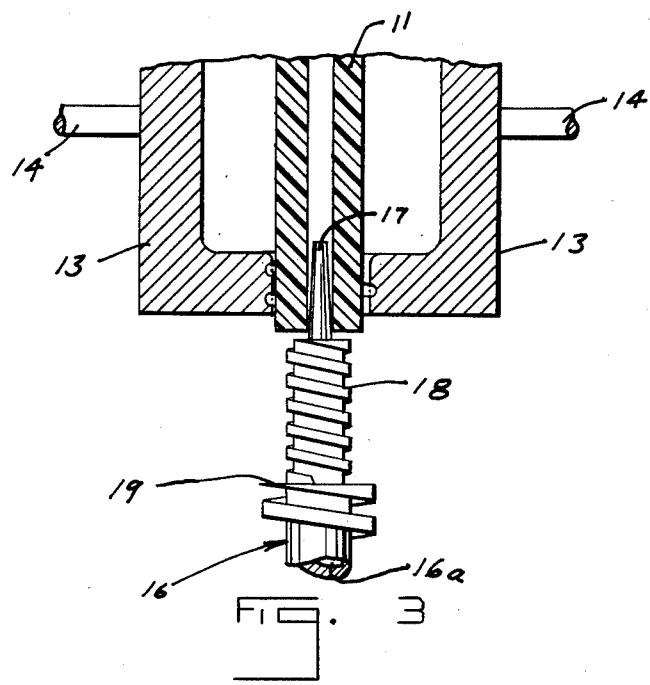
FIG. 3 is a fragmentary view of the lower portion of the closed mold showing the novel blow pipe inserted into the open end of the extruded tubing.
Figure 4:
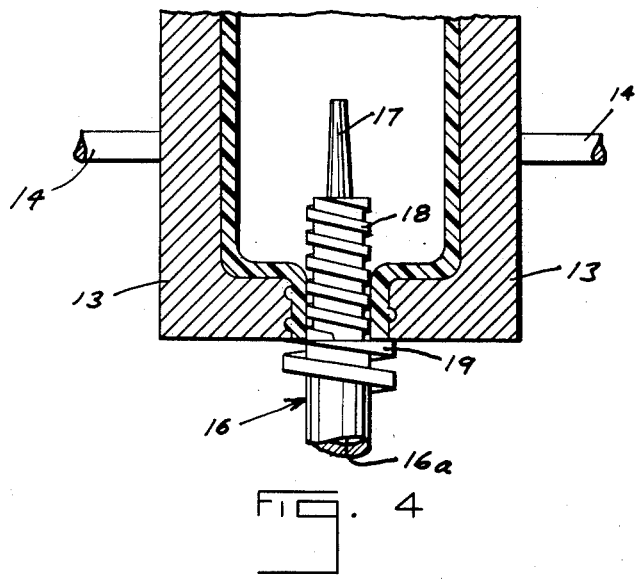
FIG. 4 is a view similar to FIG. 3 showing the heated thermoplastic expanded to conform to the mold cavity and showing the neck portion reamed to the desired diameter and showing the top of the neck trimmed.

In FIG. 3 there is shown a blow pipe generally designated 16 which is connected to a fluid cylinder (not shown) for vertical movement to and from the open end of tubing 11. Also connected to blow pipe 16 is a motor (not shown) for rotating said blow pipe. A channel 16a extends longitudinally through blow pipe 16 to permit the flow therethrough of a fluid pressure medium, such as air, for example, to expand tubing 11 in mold sections 13. Blow pipe 16 comprises three main elements: a nozzle portion 17, a drill portion 18, and a knife portion 19.

Nozzle portion 17 is tapered so that its free end which initially engages the open end of tubing 11 is smaller than the inside diameter of tubing 11 while its other end is larger than such inside diameter in order to permit it to seal such open end as it is inserted therein. Drill portion 18 is formed integral with blow pipe 16 so as to operate upon the rotatable advancement of blow pipe 16. Drill portion 18 has an effective diameter equal to the desired inside diameter of the neck portion of the finished article. Knife portion 19 is also formed integral with blow pipe 16 and operates upon the rotatable advancement of blow pipe 16. Knife portion 19 has a larger effective diameter than neck portion 26 so that the outer portion of its cutting face will, upon advancement, contact mold sections 13 and thereby prevent further advancement of blow pipe 16. The engagement between the cutting face of knife portion 19 and the mold sections insures against excessive trimming of the neck portion of the finished article.

Figure 2:
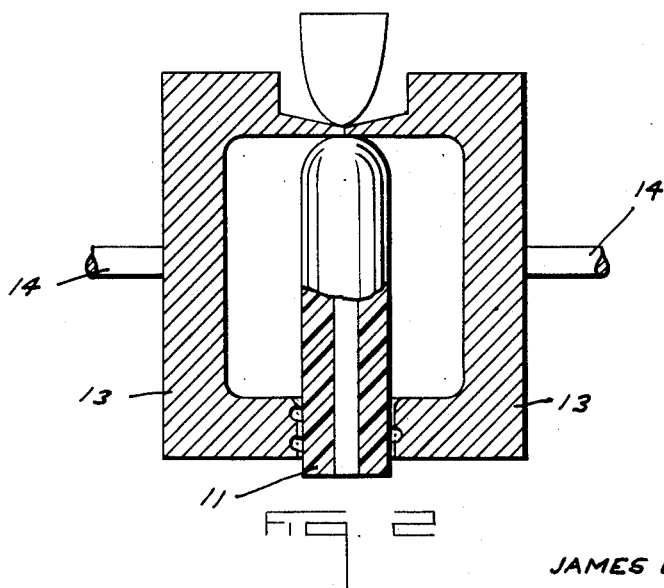
FIG. 2 is a view similar to FIG. 1 showing the sections of the blow mold in a closed position.

In the operation of this invention heated thermoplastic material is extruded from any conventional extrusion head 10 in the form of tubing 11. Tubing 11 is positioned between the open sections 13 of blow mold 12. Pistons 14, operated by fluid pressure cylinders (not shown), are actuated to close mold sections 13 around tubing 11. Upon closing of mold sections 13, knife 20 is actuated to sever tubing 11 from extrusion head 10. In this position tubing 11 is supported by the abutting edges of mold sections 13 located opposite neck portion 26, which abutting edges pinch tubing 11 (FIG. 2). As shown in FIG. 2, a small amount of excess tubing extends from neck portion 26. Retractable blow pipe 16 (FIG. 3) is then advanced so that nozzle 17 first engages and then seals the open end of tubing 11. Fluid pressure is then introduced through channel 16a to expand tubing 11 to the configuration defined by blow mold 12. Next, blow pipe 16 is rotated and further advanced so that drill portion 18 operates to ream out the inside periphery of the neck portion to the desired diameter. As blow pipe 16 continues to be rotatably advanced, knife portion 19 engages the excess thermoplastic material which protrudes from the neck portion 26 of mold sections 13 and trims such excess thermoplastic flush with mold sections 13. Thus blow pipe 16 operates to concurrently size the internal diameter and the end face of the neck portion of the hollow article. After reaming and trimming, the blow pipe 16 is retracted. During such retraction, fluid pressure is blown through channel 16a to blow out any particles that may have been forced into the hollow article. Upon removal of the blow pipe 16, the mold sections 13 are opened, the hollow article formed therein is removed, and the apparatus returned to receive the next length of thermoplastic material.

It can be easily seen from the foregoing description that this invention discloses a novel and efficient method and apparatus not only for producing hollow plastic articles free of objectionable neck flash but also for sizing the internal diameter of the neck portion of such hollow plastic article and trimming the end face of such neck portion. It is quite apparent that numerous modifications will be obvious to those skilled in the art. It is not the purpose to limit the patent granted hereon otherwise than necessitated by the scope of the appended claims.

As used herein and in the appended claims, the term "reaming" should be understood as meaning "enlarging by a cutting action."

I claim:

1. The method of manufacturing hollow thermoplastic articles of the type requiring an accurately finished, flash free, neck portion comprising forming a hollow parison of heated thermoplastic material, said parison having a tubular neck portion with exterior dimensions less than the desired minimum external dimensions of the finished neck portion of the finished article and a wall thickness sufficient to provide more thermoplastic material than will be required in the finished neck portion of the finished article, enclosing said parison in a partible blow mold having a cavity defining the external configuration of the desired article with the neck portion of the parison disposed within the neck portion of said blow mold cavity, applying fluid pressure to the interior of said parison to expand same to conform to said mold cavity, subsequently rotatably advancing a cutting tool into the neck portion of the blown plastic article to machine said neck portion to the desired finished dimensions, and thereafter opening said particle mold to release the blown article.

2. The method defined in claim 1 wherein the rotation of said cutting tool occurs substantially concurrently with but just after the step of applying fluid pressure.

3. The method defined in claim 1 wherein said cutting tool concurrently sizes the core of said neck portion and the end face thereof.

4. The method of forming hollow plastic articles of the type having a relatively small neck portion as compared with a larger body portion comprising the steps of extruding heated thermoplastic material in the form of tubing having one end open and having its inside dimension smaller than the desired inside dimension of said neck portion, closing the sections of a partible blow mold around said tubing, inserting a blow pipe into said open end, applying fluid pressure through said blow pipe, and concurrently rotatably advancing the blow pipe into the blow mold to ream the inside periphery of that portion of said tubing lying within said neck portion of said blow mold while said blow mold is closed.

5. The method of forming hollow plastic articles of the type having a relatively small neck portion as compared with a larger body portion comprising the steps of extruding heated thermoplastic material in the form of tubing having both inside and outside dimensions smaller than the corresponding desired dimensions of said neck portion, closing the sections of a partible blow mold around said tubing without pinching the portion of said tubing lying within the neck portion of said blow mold, expanding said tubing in said blow mold, and reaming the inside periphery of that portion of said tubing lying within said neck portion of said blow mold while said blow mold is closed.

6. The method of forming hollow plastic articles of the type having a relatively small neck portion as compared with a larger body portion comprising the steps of extruding heated thermoplastic material in the form of tubing having both inside and outside dimensions smaller than the corresponding desired dimensions of said neck portion, closing the sections of a partible blow mold around said tubing without pinching the portion of said tubing lying within the neck portion of said blow mold, expanding said tubing in said blow mold, reaming the inside periphery of that portion of said tubing lying within said neck portion of said blow mold, and concurrently trimming the excess portion of said tubing extending from said neck portion of said blow mold while said blow mold is closed.

7. The method of forming hollow plastic articles of the type having a relatively small neck portion as compared with a larger body portion comprising the steps of extruding heated thermoplastic material in the form of tubing having one end open and having both inside and outside dimensions smaller than the corresponding desired dimensions of said neck portion, closing the sections of a partible blow mold around said tubing without pinching the portion of said tubing lying within the neck portion of said blow mold, inserting a blow pipe into said open end, applying fluid pressure through said blow pipe and concurrently rotatably advancing the blow pipe into the blow mold to ream the inside periphery of that portion of said tubing lying within said neck portion of said blow mold while said blow mold is closed.

8. The method of forming hollow plastic articles of the type having a relatively small neck portion as compared with a larger body portion comprising the steps of extruding heated thermoplastic material in the form of tubing having one end open and having both inside and outside dimensions smaller than the corresponding desired dimensions of said neck portion, closing the sections of a partible blow mold around said tubing without pinching the portion of said tubing lying within the neck portion of said blow mold, inserting a blow pipe into said open end, applying fluid pressure through said blow pipe and concurrently rotatably advancing the blow pipe into the blow mold to, first, ream the inside periphery of that portion of said tubing lying within said neck portion of said blow mold and then trim the excess of said tubing extending from the neck poriton of said blow mold while said blow mold is closed.

9. The method of forming a blown hollow plastic article having a neck opening comprising enclosing a length of heated plasticized tubing in a blowing mold defining a molding cavity having a neck opening at one end face of the mold in such manner that an excess portion of said length of tubing projects out of said opening, the outer end of said excess tubing portion being open, inserting a hollow blow pipe into said open end tubing to effect a sealing engagement with said tubing, a portion of the blow pipe axially spaced from its end having cutting means of the same external diameter as the desired internal diameter of said neck opening, applying fluid pressure through said blow pipe to expand the tubing enclosed in the mold to the shape of the molding cavity, and rotatably advancing said blow pipe further inwardly into said molding cavity to ream the internal wall surface of said neck opening.

10. The method of forming and trimming a blown hollow plastic article having a neck opening comprising enclosing a length of heated plasticized tubing in a blowing mold defining a molding cavity having a neck opening at one end face of the mold in such manner that an excess portion of that length of tubing projects out of said opening, the outer end of said excess tubing portion being open, inserting a hollow blow pipe into said open tubing end to effect a sealing engagement with said tubing, a portion of the blow pipe axially spaced from its end having a first cutting portion of the same external diameter as the desired internal diameter of said neck opening and a second cutting portion axially spaced from its end a greater distance than said first cutting portion having an effective cutting diameter greater than said neck opening, applying fluid pressure through said blow pipe to expand the tubing enclosed within the mold to the shape of the molding cavity, and rotatably advancing said blow pipe further inwardly into said molding cavity to ream the internal wall surface of said neck opening and to trim said excess tubing.

11. For use in an apparatus for producing hollow plastic articles of the type having a neck portion and a substantially larger body portion wherein a heated thermoplastic parison having at least one end thereof open and having a smaller inside diameter than the desired inside diameter of the neck portion of the finished article is expanded in a blow mold, an improved rotatable blow pipe for expanding said parison, the improvement comprising a blow pipe having a free end which is sufficiently small to permit its insertion in the open end of said parison and a reamer portion axially spaced from said free end and having a diameter corresponding to the desired inside diameter of said neck portion.

12. For use in an apparatus for producing hollow plastic articles of the type having a neck portion and a substantially larger body portion wherein a heated thermoplastic parison having at least one end thereof open and having a smaller inside diameter than the desired inside diameter of the neck portion of the finished article is expanded in a blow mold, an improved rotatable blow pipe for expanding said parison, the improvement comprising a blow pipe having a free end which is sufficiently small to permit its insertion in the open end of said parison, a reamer portion axially spaced from said free end having a diameter corresponding to the desired inside diameter of said neck portion, and a knife portion axially spaced a greater distance from the said free end than said reamer portion and having an effective cutting diameter greater than the outside diameter of said neck portion.

13. In an apparatus for forming blown hollow plastic articles from thermoplastic tubing, the combination of a partible mold closable to define a molding cavity having a body portion and a neck portion; said molding cavity provided with an opening at the neck end face of said mold; means for closing said mold around a length of said tubing; a blow pipe comprising: a nozzle portion having its free end insertable into said tubing, means for supplying fluid under pressure to said nozzle portion, and a drill portion axially spaced from said free end having an effective diameter corresponding to the desired internal diameter of the neck portion of the finished article; and means for rotatably advancing said blow pipe to first engage and expand said tubing, and then to ream the neck portion of the hollow article to the desired internal diameter.

14. In an apparatus for forming blown hollow plastic articles from thermoplastic tubing, the combination of a partible mold closable to define a molding cavity having a body portion and a neck portion; said molding cavity provided with an opening at the neck end face of said mold; means for closing said mold around a length of said tubing with an end portion of said tubing projecting out of said neck end face; a blow pipe comprising: a nozzle portion having its free end insertable into said tubing, means for supplying fluid under pressure to said nozzle portion, a drill portion axially spaced from said free end having an effective diameter corresponding to the desired internal diameter of the neck portion of the finished article, and a knife portion axially spaced a greater distance from said free end than said drill portion and having an effective cuttting diameter greater than said molding cavity opening; and means for rotatably advancing said blow pipe to first engage and expand said tubing, then to ream the neck portion of the hollow article to the desired internal diameter, and finally to trim said end portion of said tubing.

References Cited in the file of this patent
UNITED STATES PATENTS

| | | |
|---|---|---|
| 2,909,081 | Kuts | Oct. 20, 1959 |
| 2,928,120 | Leghorn et al. | Mar. 15, 1960 |
| 3,025,562 | Nelson | Mar. 20, 1962 |

OTHER REFERENCES

Modern Plastics, "Bottle Finisher," September 1961, v. 39, No. 1, pages 52 and 54.